(12) United States Patent
Starr

(10) Patent No.: US 6,597,958 B1
(45) Date of Patent: Jul. 22, 2003

(54) METHOD FOR MEASURING THE CONTROL PERFORMANCE PROVIDED BY AN INDUSTRIAL PROCESS CONTROL SYSTEM

(75) Inventor: Kevin D. Starr, Lancaster, OH (US)

(73) Assignee: ABB Automation Inc., Norwalk, CT (US)

( * ) Notice: Subject to any disclaimer, the term of this patent is extended or adjusted under 35 U.S.C. 154(b) by 348 days.

(21) Appl. No.: 09/815,205

(22) Filed: Mar. 22, 2001

(51) Int. Cl.[7] .............................................. G05B 13/02
(52) U.S. Cl. ........................ 700/29; 700/30; 700/31; 700/37; 700/44; 700/52; 703/2; 702/82; 318/561
(58) Field of Search ............................. 700/29–31, 37, 700/39, 44, 52; 702/82; 703/2; 318/561

(56) References Cited

U.S. PATENT DOCUMENTS

| | | | | |
|---|---|---|---|---|
| 4,922,412 A | * | 5/1990 | Lane et al. ................... 700/37 |
| 5,257,206 A | * | 10/1993 | Hanson ...................... 700/273 |
| 5,282,130 A | * | 1/1994 | Molnar ......................... 700/37 |
| 5,519,605 A | * | 5/1996 | Cawlfield ..................... 700/31 |
| 5,522,224 A | * | 6/1996 | Canney ........................ 62/656 |
| 5,684,375 A | * | 11/1997 | Chaffee et al. ............. 318/638 |
| 6,253,113 B1 | * | 6/2001 | Lu ............................... 700/28 |
| 6,546,295 B1 | * | 4/2003 | Pyotsia et al. ................ 700/37 |

* cited by examiner

Primary Examiner—Emanuel Todd Voeltz
Assistant Examiner—Crystal J. Barnes
(74) Attorney, Agent, or Firm—Michael M. Rickin

(57) ABSTRACT

A method for determining the measure of control provided to a process by a control system. The determines process model parameters for a simple and complex model of the process and uses those parameters along with the value of the process variable and the final control element position to predict the off control data. The method also uses the process model parameters to determine the optimal tuning and then forecasts the optimal process performance from the predicted off control data and the determined optimal tuning.

17 Claims, 8 Drawing Sheets

MODEL MISS-MATCH

BUMP TEST EXAMPLE

TUNING CALCULATIONS

CONTROL FITNESS EXAMPLE

CONTROL MONITORING

CONTROLLABLE PROCESS PROBLEM EXAMPLE

CONTROL TUNING PROBLEM

UNCONTROLLABLE PROCESS PROBLEM

METHOD FOR MEASURING THE CONTROL PERFORMANCE PROVIDED BY AN INDUSTRIAL PROCESS CONTROL SYSTEM

1. FIELD OF THE INVENTION

This invention relates to industrial process control systems and more particularly to the measurement of the control provided by such systems to the process.

2. DESCRIPTION OF THE PRIOR ART

Users of industrial process control systems are concerned with how well their control is performing. That concern may be framed as an inquiry asking if the control can be improved; or how well is the process doing; or how often should the control loops be retuned; or is there a number which tells the user how the system is performing!

The process control industry tries to answer these questions by calculating the standard deviation of the signal being controlled. It is thought that if the standard deviation is good or bad, then control must be good or bad. The standard deviation is a good measure of process performance, but is not a good measure of control performance. For example a high standard deviation could be the result of either a poorly tuned control loop or load disturbances that occur at frequencies beyond the capability of the controller.

Another drawback of using standard deviation as a measure of the effectiveness of the control is that it does not tell the user of the process control system how good the system could be. Many times a control system may be optimally tuned, but the standard deviation is outside of the user's product specifications. The user then spends much time trying to retune an already perfectly tuned controller. The user has no tool that allows the user to make an informed decision on whether to spend money on process control re-tuning, new algorithms, or process changes.

In the past, control performance was measured by comparing standard deviations of several hours of data collected during a "blind" run and an "on control" run. The blind run is a running of the process with the control system off and no operator intervention. The on control run is taken with all the controls in the automatic mode. The amount that the on control standard deviation is better than the off control standard deviation is an indication of how the control is doing.

Aside from the problems with standard deviation already mentioned, there are several additional problems with using the standard deviation method to measure control effectiveness. The standard deviation method shows how the system performs as compared to no control. Users rarely run their process control systems in the "no control" mode. Therefore this control performance measure has very little meaning. Also, a user will rarely allow its control system to be turned off for several hours. As a result, the "no control" mode performance measure is usually not done. Even when this performance measure is done, the disturbances that impact the "no control" run must be the same as those that impact the on control run. In the real world this is never the case.

A recent attempt to solve the problem of determining the quality of control performance is by comparing current control performance with that of an ideally tuned controller. Methods to accomplish this comparison are the well known Minimum Variance and Harris Index. These methods work fairly well for systems with limited amounts of process delay. However, systems with process delay cause problems with these methods as in such systems the methods result in forecasts that can not be achieved. The methods indicate that the control system should be able to perform better than what is possible. These methods are good for identifying the limit, but they do not identify what is the best that the specific control system can perform.

As a result, users have relied on the experience of the control engineer to tell the user when the control system is tuned as good as it can be. This usually results in user confusion. A new control engineer will visit the plant with more experience than the last control engineer that has visited the plant and the new control engineer re-tunes the loops. The results may be better than the tuning produced by the last engineer.

The user enters a pattern where the user looks for more and more experienced control engineers. The user conclusion is that control performance can always be made better with the increased experience of the control engineer. The user is never convinced that its control system is setup and tuned as good as it can be, because the user is never convinced that the control engineer is the best there is. This pattern may become dangerous if the next control engineer is not as experienced as the previous control engineer. The user pattern will continue as long as there is not a good measure of control and process performance.

The present invention answers the user questions about control and control performance in such a way that control and process performance is easily measured. The present invention allows the user to make informed decisions on when to retune a controller, when an algorithm needs to be replaced, or when the process needs to be changed.

SUMMARY OF THE INVENTION

A method for measuring the control provided by a control system to a process. The system has a controller for controlling the position of a final control element to control a process variable. The method has the step of determining process model parameters for a simple model and a high order model of the process. The method also has the steps gathering the value of the process variable and the final control element position; predicting off control data using the determined simple and high order models parameters and the gathered value of the process variable and the final control element position; determining the optimal tuning using the determined simple and high order models parameters; and forecasting the optimal process performance from the predicted off control data and the determined optimal tuning.

A method for measuring the control provided by a control system to a process. The system has a controller for controlling the position of a final control element to control a process variable. The method has the step of performing a bump test on the process to determine process model parameters for a simple model and a high order model of the process. The method also has the, steps of gathering the value of the process variable and the final control element position; predicting off control data using the simple and high order models parameters determined by performing the bump test and the gathered value of the process variable and the final control element position; determining the optimal tuning using the simple and high order models parameters determined by performing the bump test; and forecasting the optimal process performance from the predicted off control data and the determined optimal tuning.

A method for measuring the control provided by a control system to a process. The system has a controller for controlling the position of a final control element to control a process variable. The method has the step of determining process model parameters for a simple model and a high order model of the process. The method also has the steps of predicting off control data using the determined simple and high order models parameters and the value of the process variable and the final control element position; determining the optimal tuning using the determined simple and high order models parameters; and forecasting the optimal process performance from the predicted off control data and the determined optimal tuning.

DESCRIPTION OF THE PREFERRED EMBODIMENT(S)

Figure 1:
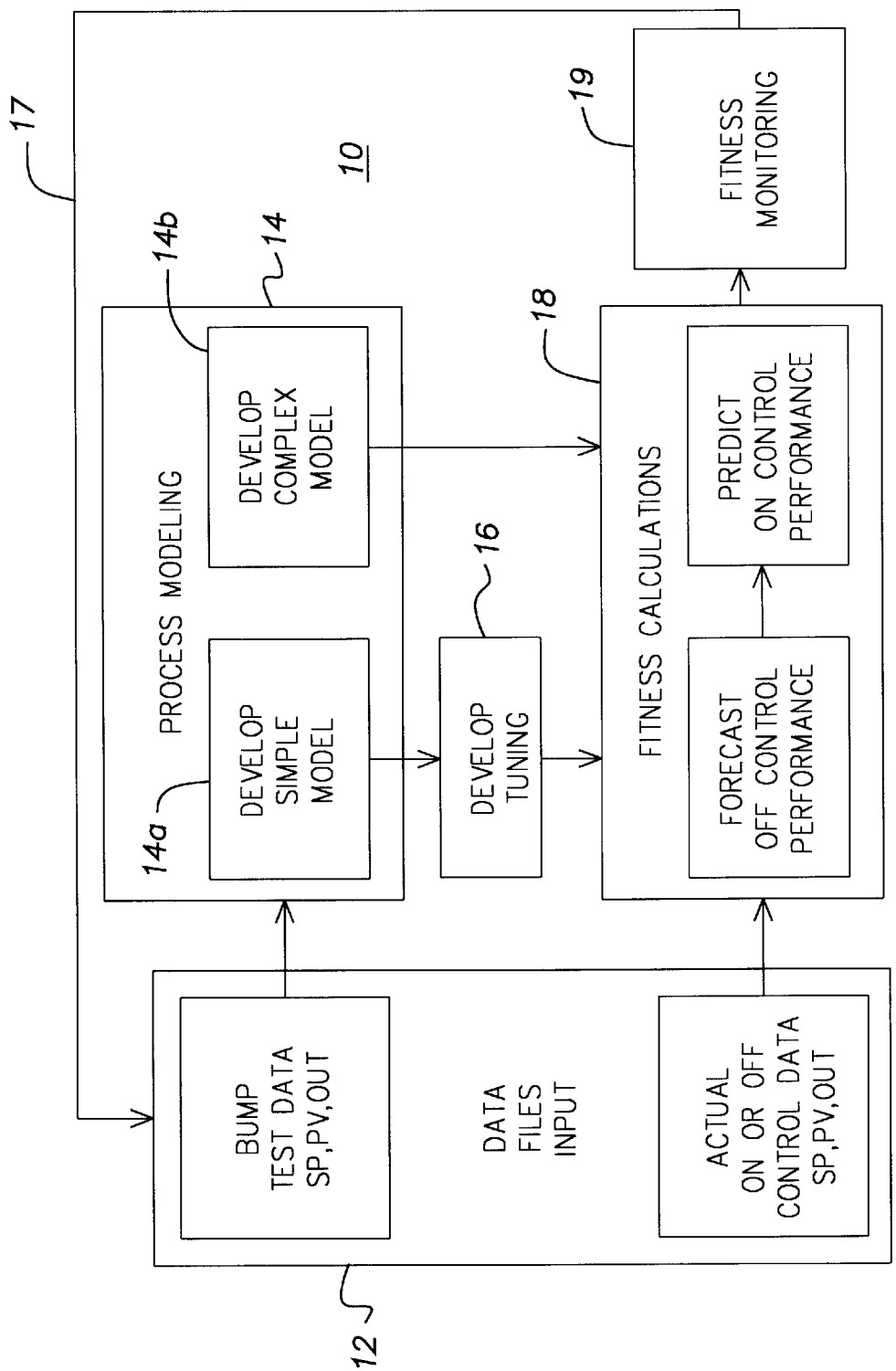
FIG. 1 shows a block diagram that illustrates the five components of the present invention for operation in a batch mode.

The technique of the present invention, which is based on the conservation of energy, provides a measure of how good is the control provided by a process control system. This measure can apply to any process control system regardless of process, control strategy, or platform type. This measure can be performed continuously or in a batch fashion.

In the technique of the present invention the energy of a process disturbance is either translated to the process being controlled or redirected to the final control element of the process control system. This translation of the energy of a process disturbance to the controlled process or the redirection of that energy to the final control element is used along with a high order process model, to project the impact the disturbance would have on the process if the control loop had been turned off. The high order process model is determined by the use of minimally invasive process setpoint changes. These changes are within the off specification limits of the production of the user of the control system. As a result, neither control loop efficiency or product quality is jeopardized with this methodology.

Once a high order process model and a controller constrained, that is, an off control, process model have been determined, the optimal, robust, and achievable controller parameters can be found. These optimal controller parameters are then used with the control algorithm then in use, the off control projection, and the high order process model to simulate how the optimal control strategy will perform in an on control condition, that is, to provide an accurate on control forecast.

The off control projection, the "as-is" on control performance, and the new on control forecast can then be used to accurately describe the current performance of the process, the final control element, and the process control system. A control system user can use this data to easily assess whether a process control problem is either a process problem or a control problem. This assessment can either be done using trending of the sigma of these three signals or taking the ratios of their sigmas. The results of the assessment can be customized based on the view the customer deems most beneficial.

The key to the technique of the present invention is process modeling as the off control projection and the optimal on control forecast are no better than the validity of the process model. In order to obtain an accurate process model, energy needs to be injected into the process by the final control element. The relationship between the change in the process versus the change in the final control element is referred to as the process model.

In the past, the relationship between the change in the process versus the change in the final control element was determined by turning the control system off and making large changes to the final control element to be able to "see" the process change. This methodology works well when the control loop can be turned off. However, some users of process control systems do not allow the control systems to be turned off in order for this test to be performed. Also in some cases control systems can not be turned off.

Users, however, rarely object to a slight change in the setpoint of the on control process. When a control setpoint is changed, no matter how poorly the loop may be tuned, the final control element is changed. This change does produce a process change. The interaction between the final control element and the process measurement can be used to accurately determine an open loop process model.

Currently, simple process models are used to determine process control parameters. These simple process models are usually first order or first order plus delay models. These models represent rough approximations of what the process will do when a final control element is changed. Since these are rough approximations, there is always a difference between what the process actually does and what the simple process model estimate projects. As a result, optimal control loop performance can not be achieved. The reason is that the controller can not distinguish between model estimate error and actual process disturbance.

The technique of the present invention uses the highest reasonable model order that results in the smallest acceptable estimation error. This model is then used with the controller optimized to determine the optimal performance that this controller can achieve. Since the high order process model closely approximates the actual process, the controller can be "pushed" to the limit. In the past, the "limit" was determined based on the experience of the control engineer doing the tuning. Now with the high order process model, the "limit" for control performance can be measured.

As was described above, the computer implemented method of present invention is a technique for evaluating the performance of any industrial controller. The controller can be controlling a batch process or a continuous process and thus the method of the present invention can be run in either a batch mode or a continuous mode.

For a batch process the method of the present invention requires the entry of two data files. These are a bump test file and an on control data file. Both files must contain information about the process variable, the output of the controller, and the setpoint of the controller. In the batch mode the information about the process variable and the output of the controller for the on control data file are gathered for a statistically valid period of time. In the continuous mode, the controller still requires a bump test file but the on control data can be sent directly to the program that implements the method. In the continuous mode the information about the process variable and the controller output are gathered continuously for the on control data file.

The block diagram shown in FIG. 1 illustrates the five components of the method 10 of the present invention for operation in the batch mode. These are the data files input 12, process modeling 14, tuning 16, fitness calculations 18, and fitness monitoring 19.

In process modeling 14, two process models must be determined. They are the simple model 14a and the complex model 14b.

Figure 2:
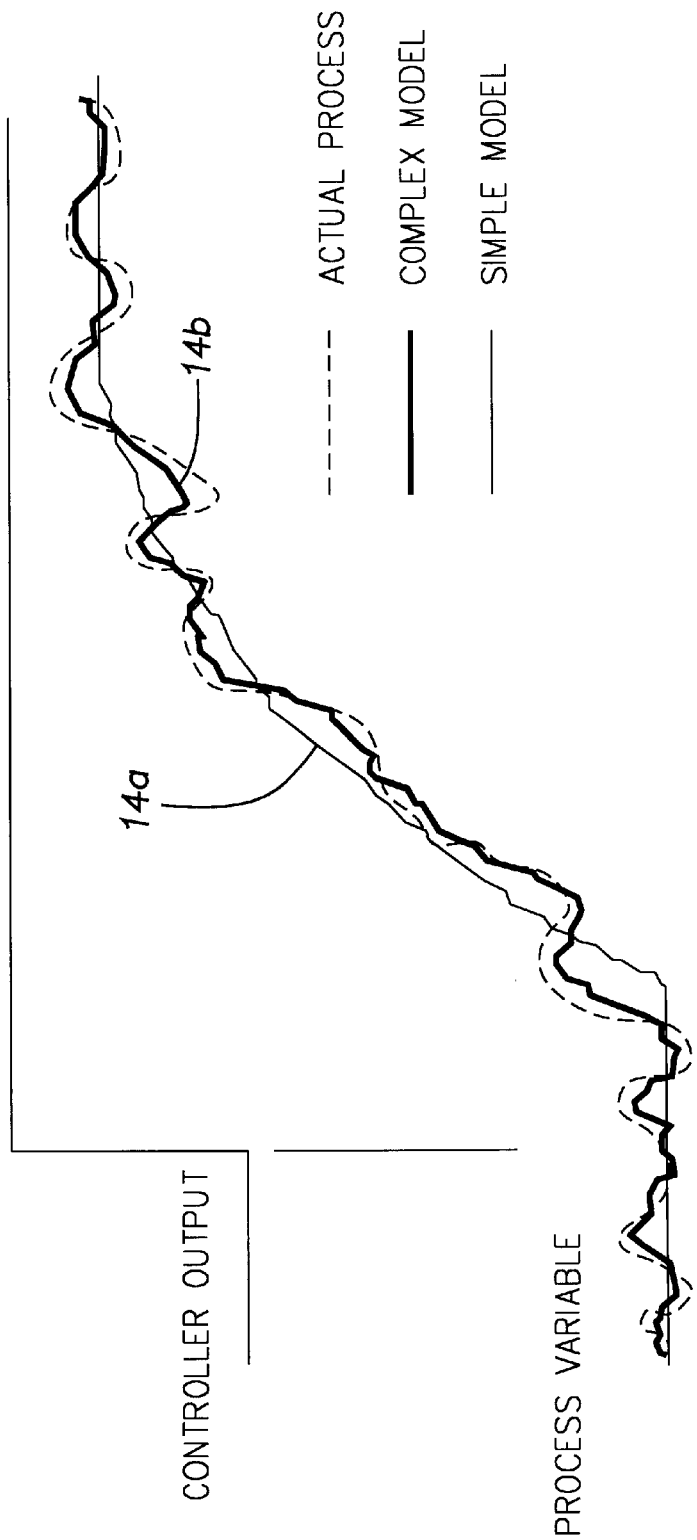
FIG. 2 illustrates one example of each of a simple model and a complex model to model a batch process.

One example of a simple model 14a and a complex model 14b to model a batch process is shown in FIG. 2. As is shown in FIG. 2, there is a step change to the controller output which results in a change to the process variable. The response of the actual process is shown in FIG. 2 by the dashed line. The response of the simple model 14a is shown by the light colored solid line and the response of the complex model 14b is shown by the dark colored solid line.

The simple model 14a is defined by the user of method 10. The simple model 14a is a model that captures the major process dynamics. In the case of a self regulating process, the process dynamics are the process gain, time constant, and process delay. The simple model 14a is used to determine the type of controller and control strategy to be used.

The complex model 14b is large enough to capture all the dynamics in the process. The complex model 14b represents the best mathematical fit to the original data. The complex model 14b is used to simulate the process response to the controller output. Non-linearity's such as stiction, backlash, and valve gain are included in the complex model 14b.

Figure 3:
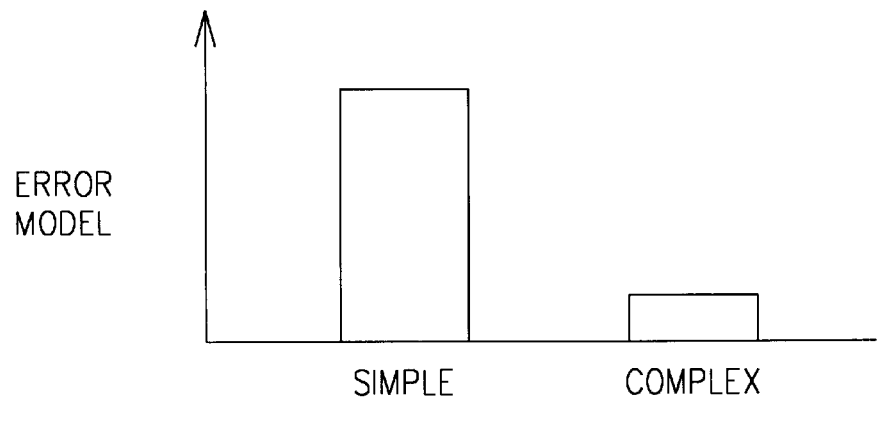
FIG. 3 shows the model mismatch for the process having the simple and complex models shown in FIG. 2.

The complex model 14b should result in the smallest model mismatch to the process. The model mismatch can be determined based on the overall difference between the actual process and the process model. FIG. 3 shows the model mismatch for the process having the simple and complex models shown in FIG. 2. As can be seen from FIG. 3, the simple model 14a has much more mismatch with the actual process as compared to the mismatch of the complex model 14b with the actual process.

As is well known to those of ordinary skill in the process control art there are several "off the shelf" methods for obtaining a process model. Any method can be used in the present invention to obtain the simple and complex models.

One example of a simple 14a and a complex model 14b is now described for a process that has a consistency control loop. In such a loop, dilution water is added to a flow through a valve. The consistency of the flow is then measured and that measurement is fedback to a controller. The output of the controller adjusts the dilution valve. In these types of control loops, there can be delay as a result of the time it takes for the dilution water to impact the process and the time it takes for the sensor to send the new consistency information back to the controller.

Figure 4:
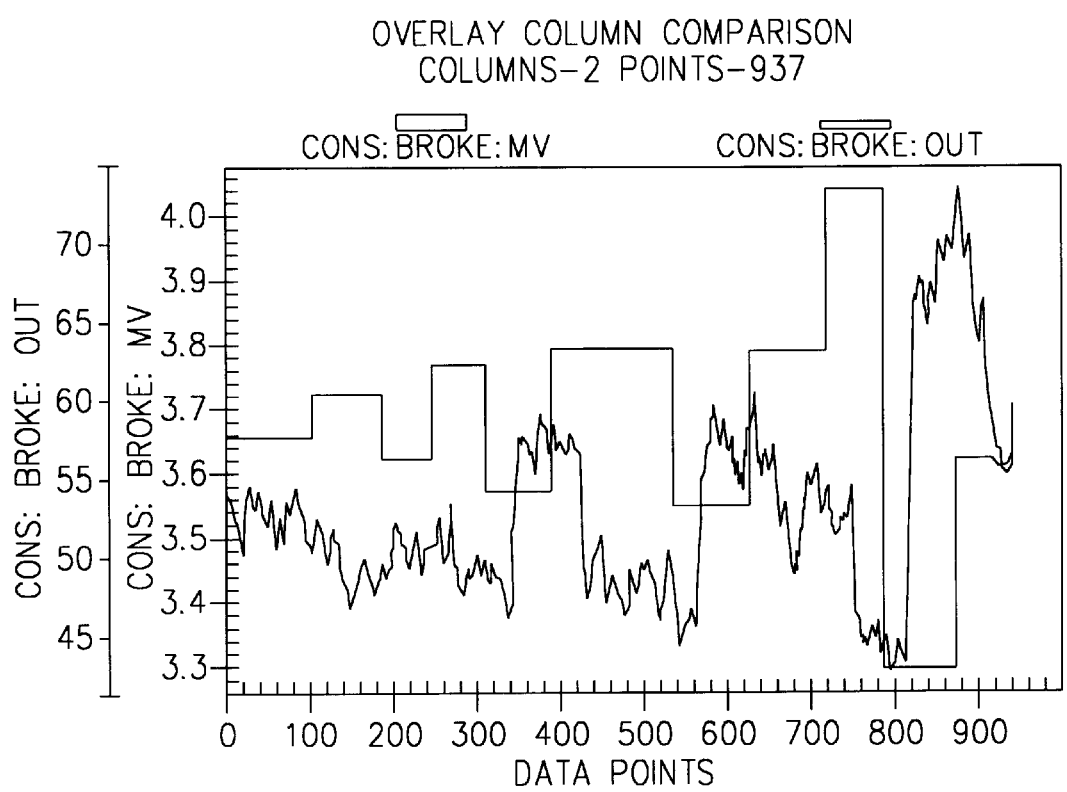
FIG. 4 shows a bump test of a typical process in the form of a consistency control loop.
Figure 5:
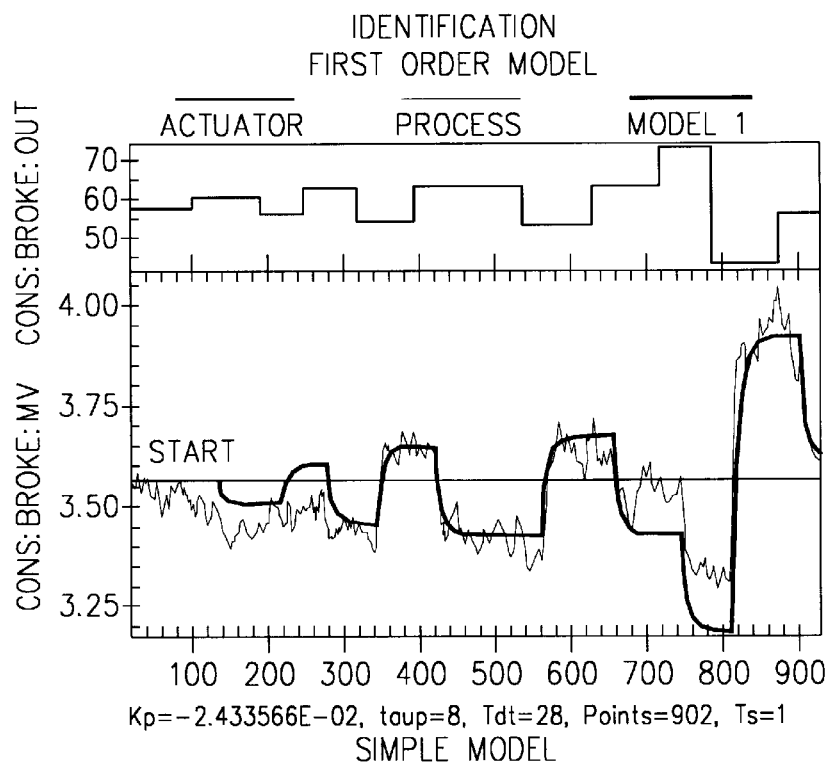
FIG. 5 shows the simple model for the typical process of FIG. 4.
Figure 6:
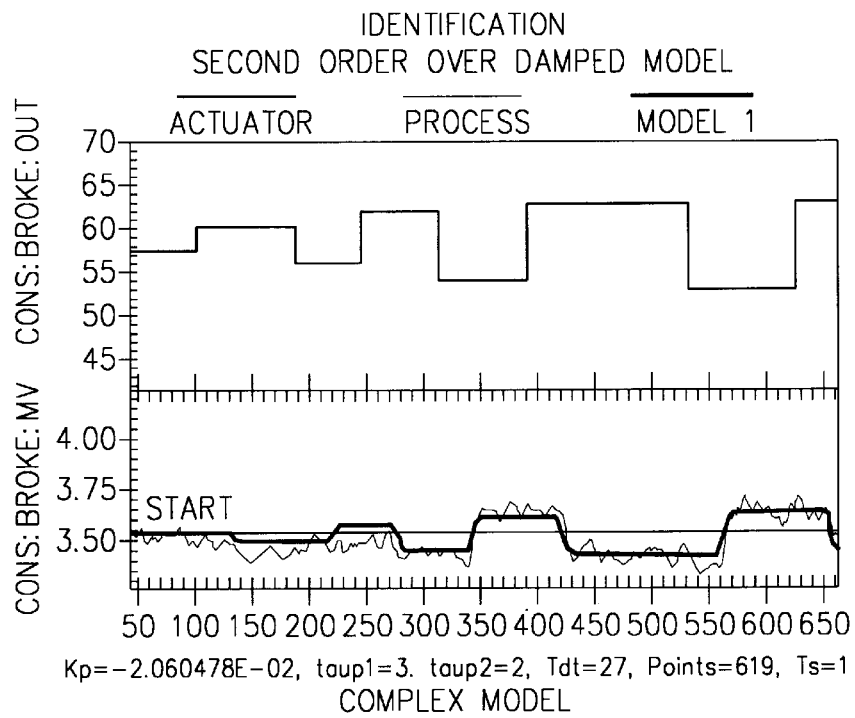
FIG. 6 shows the complex model for the typical process of FIG. 4.

A bump test of the consistency control loop process is shown in FIG. 4. This figure shows the input to the final control element which is a square wave type signal, along with the output of the process. FIG. 5 and FIG. 6 are the results of the simple and complex models. There are three plots in each figure. The top plot represents the input to the final control element. The two plots that are overlayed represent the actual process response and the predicted process response. The predicted process response is the "smooth" signal. This is calculated from the process input and the selected process model. The simple first order plus delay model 14a of FIG. 1 is shown in FIG. 5. The complex model 14b of FIG. 1 is shown in FIG. 6. In this case, a second order overdamped process model was found to be adequate to capture the dynamics of the process.

There are several well known and standard methods in use in the process automation industry to tune a control loop. The user of the method 10 of the present invention can select from any of those tuning methods. The simple model 14a is usually used to produce the simplest controller that still produces the desired closed loop specifications. The simple model 14a is good for calculating the controller, but it can not be used for simulation of the process.

Figure 7:
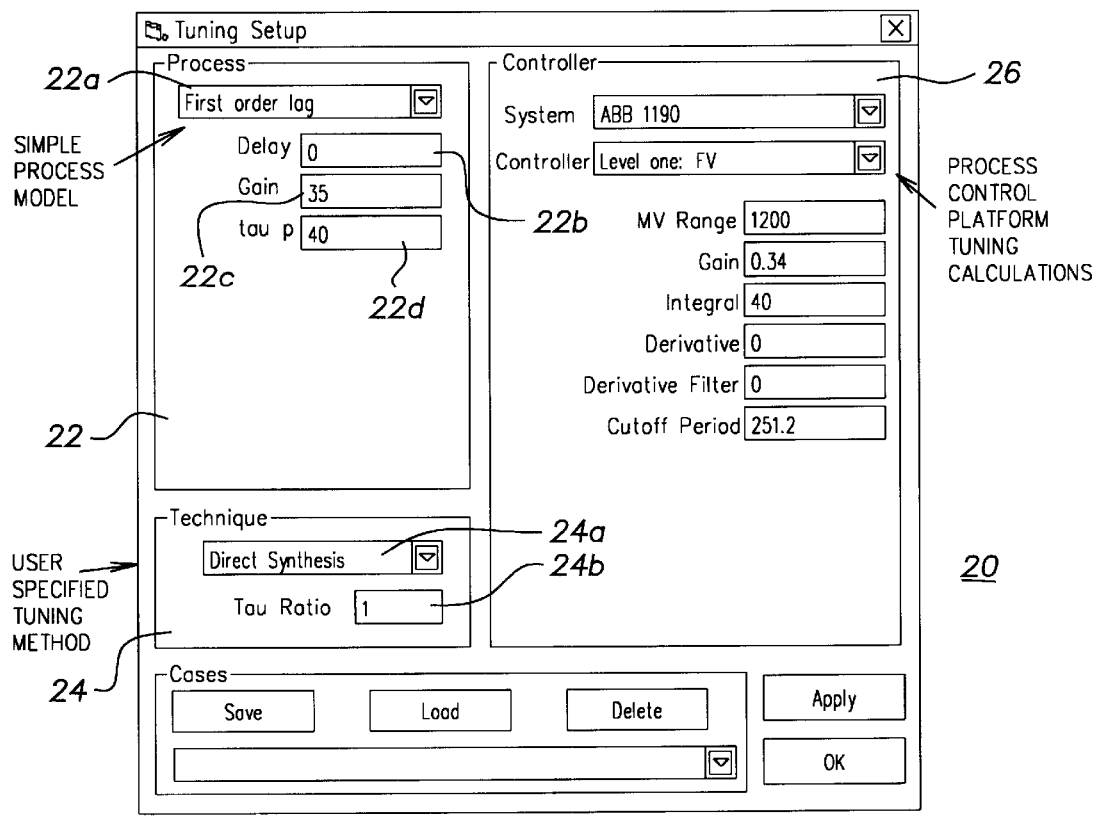
FIG. 7 shows a print of the computer screen which is used by the user of the method of the present invention to determine best type of controller for the simple model.

The method of the present invention includes a simple way of determining the best type of controller for a simple model. FIG. 7 shows a print for the screen 20 that is used by the user of the method to determine the controller. Screen 20 is divided into three areas 22, 24 and 26 entitled "Process", "Technique" and "Controller" respectively.

Area 22 "Process" allows the user of method 10 to designate the type of simple process model 22a and assign parameters such as "Delay" 22b, "Gain" 22c and "tau p" (the process time constant) 22d associated with the selected model 22a. In the example shown in FIG. 7, the user has specified the "First order lag" as the simple process model 22a and has set the "Delay" 22b to zero, the "Gain" 22c to 35 and the "tau p" 22d to 40.

Area 24 "Technique" allows the user to specify the tuning method 24a and the "Tau Ratio" 24b associated with the specified tuning method. The Tau ratio is a number that can be used to adjust the control aggressiveness. The smaller the value of the Tau ratio, the more aggressive the controller. In the example shown in FIG. 7 the user has specified the "Direct Synthesis" technique as the tuning method 24a and has assigned a "Tau Ratio" 24b of "1" to that method.

Area 26 "Controller" provides information about the controller specified by the user. The tuning information shown in area 26 is in accordance with the controller selected by the user.

In order to measure the performance of a control loop, the performance of the control loop in the absence of process control must be determined. In the prior art this determination is made by turning the controller off and recording the process. There are several reasons why this is often not a good indication. First, when the controller is off, the operators are more likely to manually intervene. Secondly, disturbances that happen when the controller are off must be the same as when the controller is on in order for the comparison to be valid. This is never the case in the real world. Finally, turning controllers off long enough to get a valid measurement for comparison is often difficult if not impossible.

The basis for the calculation of the method of the present invention that tells a control system user how well the control system is functioning is the ability to measure the off control process and the on control process at the same time. As is shown in Equation 1 below, the process energy is the net sum of all disturbances and the process to valve response. It should be noted that the equations herein are not exact mathematical expression, but rather equations in principle.

$$\text{Process} = \Sigma\text{Disturbances} + \text{Controller Output} * \text{Complex Model} \quad \text{Equation 1}$$

In process control, the goal is to have the process energy, that is, equation 1, equal zero. This means that all disturbance energy is absorbed in the controller output which results in the complete cancellation of the process disturbance. Therefore, by monitoring the process and the controller output, the process in the absence of control, that is, an off control process, can be determined. This determination requires as is shown in Equation 2 below, the complex model, the controller output, and the process measured value.

$$\Sigma\text{Disturbances} = \text{Off Control Process} = \text{Process} - \text{Controller Output} * \text{Complex Model} \quad \text{Equation 2}$$

Once the off control process has been determined, the best possible process control response can be accurately determined. This determination requires as is shown in equation 3 below, the off control process prediction, the new controller outputs as a result of the controller tuned with the simple model, and the complex model.

$$\text{Process Forecast} = \text{Off control process} + \text{new Controller Ouputs} * \text{Complex Model} \quad \text{Equation 3}$$

This determination of the best possible process control response is easily performed with the method of the present invention.

Once the calculations described above have been performed, corrective actions may need to be taken. The; calculations may show that a process problem, for example the process range is outside of the control range; or a, hardware problem, for example a malfunctioning valve or a faulty transmitter; or a re-tuning problem.

If the corrective action is a re-tuning of the control loop, then a sequence of corrective action steps would be automatically or manually initiated. FIG. 1 shows a closed loop 17 which results in automatic initiation of the corrective action steps. The corrective action steps involve bumping the process, automatically determining the required models, determining optimal tuning parameters, making changes to the systems tuning, and starting the calculations again.

If the corrective action is related to process problems, then a series of potential solutions would be provided to the operator. If the corrective action is related to hardware problems, then an identification of the problem and source would be provided to the operator. Once the process or hardware problem is corrected the bump test is performed, followed by the determination of the required models and the optimal tuning parameters and making changes to the system tuning.

Figure 8:
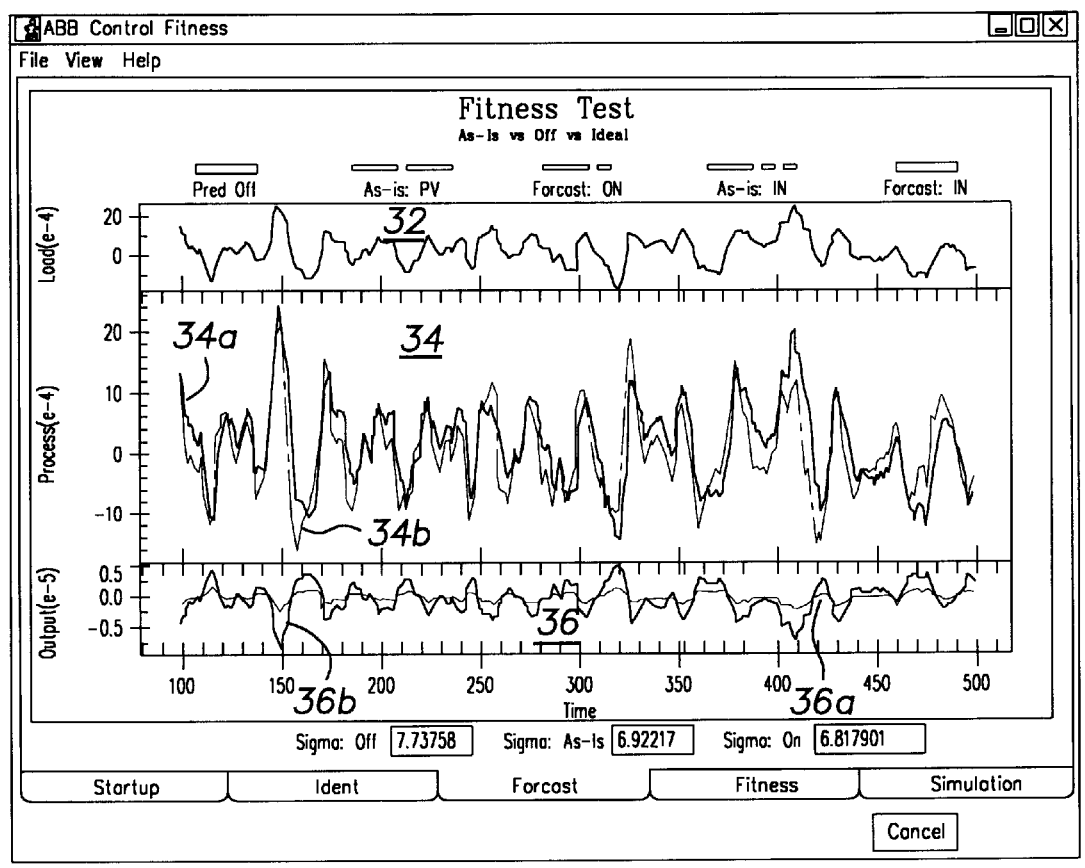
FIG. 8 shows a print of the computer screen which is used by the user of the method of the present invention to determine the best possible process control response.

FIG. 8 shows a print for the screen 30 that is used by the user of method 10 to determine the best possible process control response. The example in FIG. 8 is based on the same consistency process as that for the bump test example described above in connection with FIGS. 4–6. The controller that is being evaluated in FIG. 8 is a simple PI controller.

FIG. 8 shows three groups of plots 32, 34 and 36. The top group 32 is only a single plot that represents the predicted off process variable (PV), that is, what the process would have done if the valve had not moved. The next group 34 includes two plots 34a, 34b one of which, As-Is:PV 34a, shows what the process did and the other of which, Best:PV 34b, the forecast, that is, what the process would do under different tuning. Best:PV is the forecasted best possible control response based on the complex model, controller type, and simple model used. The third group 36 which also includes two plots 36a, 36b shows a plot Actual Value 36a which is what the controller output did, and a plot Predicted Value 36b which is what the controller output would do under new tuning.

There has been described three ways to measure the process namely, As-Is, Predicted Off, and Forecasted On. Each of these three ways have to each now be characterized by numbers that represent how the process is performing. There are several ways of doing this. The simplest way is to take the standard deviation, sigma, of all three. In the example consistency control loop described herein, the sigma of all three process measurements are shown in FIG. 9.

Figure 9:
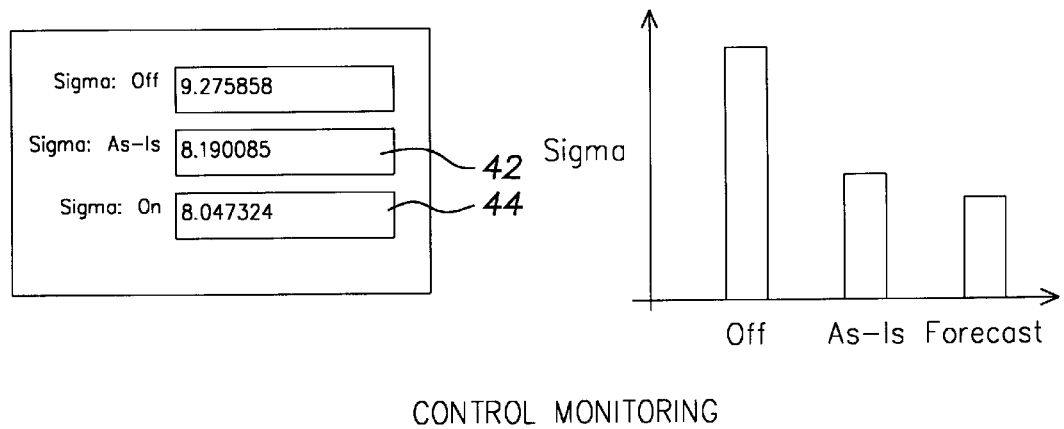
FIG. 9 shows the sigma of the As-Is, Predicted Off and Forecasted On process measurements.

As can be seen from FIG. 9, the As-Is sigma 42 and the Forecasted On 44 sigma are almost identical. This substantial equality indicates that the current tuning of the control system is adequate and that the problem with system performance lies in the process. Thus the method of the present invention informs the user that further tuning of the control system will not improve system performance and that only changes to the process will improve performance.

Figure 10:
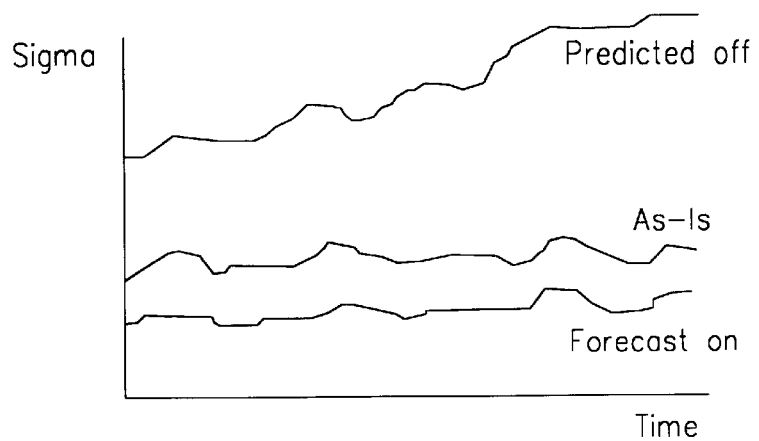
FIG. 10 shows the trending of the Predicted Off, As-Is and Forecasted On for a degrading process.
Figure 11:
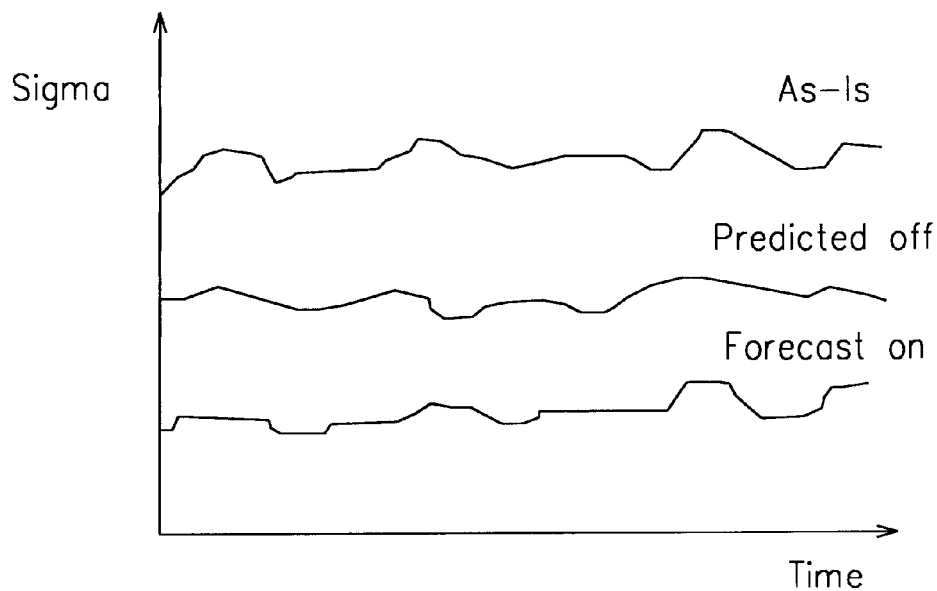
FIG. 11 shows the trending of the Predicted Off, As-Is and Forecasted On for a poorly tuned process.
Figure 12:
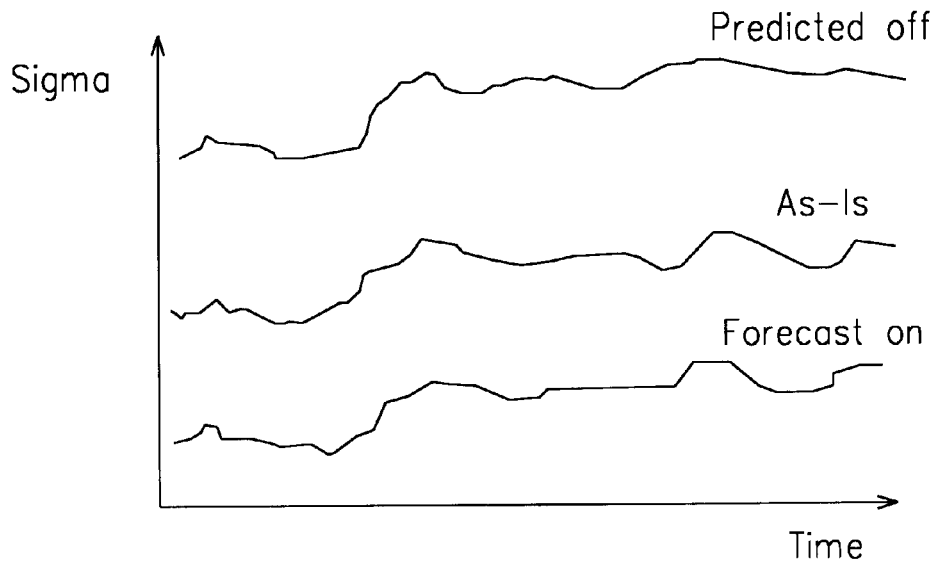
FIG. 12 shows the trending of the Predicted Off, As-Is and Forecasted On for a process problem that is beyond the capability of the controller to control.

The sigma values shown in FIG. 9 can be trended over time which will give further information on the performance of a controller. FIGS. 10, 11 and 12 are three examples of the potential outcome of trending the sigmas over time.

FIG. 10 shows the trending of "Predicted Off", "As-Is" and "Forecast On" for a degrading process. It should be noted from FIG. 10 that the As-Is process does not indicate any process problems. The reason is that the nature of the disturbance is such that the controller can compensate for the disturbance by moving the actuator. The net result is that the control performance is good, but a process failure is possible because the predicted off control process is degrading.

In FIG. 11 the As-Is process is much worse than both the Predicted Off and the Forecast On. Since the Predicted Off and the Forecast On are close, the process is not the problem. In this case, a controller has been poorly tuned, or the process has changed and no longer matches the original tuning of the loop.

In FIG. 12 all three trends show a step increase. This indicates a process problem that is beyond the capability of the controller to regulate out. Since all three trends went up the problem is with the process.

As was described above another feature of the technique of the present invention is the ability to analyze off control process performance, that is, performance of the process with no movement of the final control element. The high order process model can be used to generate a very accurate picture of what the process would do if the final control element did not move. This projection provides a non-invasive look into process operating conditions in the absence of process control. This condition gives the user of the technique of the present invention a view of the response of the process control system that is normally not possible as the user will not allow process control to be turned off long enough to get this view of its system.

Also as was described above, another feature of the technique of the present invention is the use of on control forecast to immediately evaluate the potential new tuning. In the past, when new tuning was performed, the benefit or failure of the new tuning numbers was not seen for several hours of on control performance. If the new tuning numbers were not accurate, the process would degrade. This would result in re-tuning again and then waiting to see what happens. The present invention provides an immediate forecast of how the control system will respond as a result of new tuning or even new control strategies. The accuracy of this forecast is, tied directly to the high order process model. Since this model provides an accurate picture of how the process will respond to final control elements, it can be used to simulate what the process will do under different control tuning strategies and conditions.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for measuring the control provided by a control system to a process, said system having a controller for controlling the position of a final control element to control a process variable and said method comprising the steps of:
    (a) determining process model parameters for a simple model and a high order model of said process;
    (b) gathering the value of said process variable and said final control element position;
    (c) predicting off control data using said determined simple and high order models parameters and said gathered value of said process variable and said final control element position;
    (d) determining the optimal tuning using said determined simple and high order models parameters; and
    (e) forecasting the optimal process performance from said predicted off control data and said determined optimal tuning.

2. The method of claim 1 further comprising the step of performing a bump test to determine said simple and high order models parameters.

3. The method of claim 1 further comprising the step of setting a predetermined criteria for alarming based on said gathered value of said process variable and said final control element position, said predicted off control data, and said determined optimal tuning.

4. The method of claim 2 further comprising the step of setting a predetermined criteria for alarming based on said gathered value of said process variable and said final control element position, said predicted off control data, and said determined optimal tuning.

5. The method of claim 1 wherein said process is a batch process and said process variable value and said final control element position are gathered for statistically valid period of time.

6. The method of claim 1 wherein said process is a continuous process and said process variable value and said final control element position are gathered continuously.

7. The method of claim 1 wherein said determining of said process model parameters and said determining of said optimal tuning are performed when said predetermined criteria for alarming indicates that corrective action should be undertaken.

8. The method of claim 4 wherein said performing of said bump test and said determining of said optimal tuning are performed when said predetermined criteria for alarming indicates that corrective action should be undertaken.

9. A method for measuring the control provided by a control system to a process, said system having a controller for controlling the position of a final control element to control a process variable and said method comprising the steps of:
    (a) performing a bump test on said process to determine process model parameters for a simple model and a high order model of said process;
    (b) gathering the value of said process variable and said final control element position;
    (c) predicting off control data using said simple and high order models parameters determined by performing said bump test and said gathered value of said process variable and said final control element position; (d) determining the optimal tuning using said simple and high order models parameters determined by performing said bump test; and (e) forecasting the optimal process performance from said predicted off control data and said determined optimal tuning.

10. The method of claim 9 further comprising the step of setting a predetermined criteria for alarming based on said gathered value of said process variable and said final control element position, said predicted off control data, and said determined optimal tuning.

11. The method of claim 9 wherein said process is a batch process and said process variable value and said final control element position are gathered for statistically valid period of time.

12. The method of claim 9 wherein said process is a continuous process and said process variable value and: said final control element position are gathered continuously.

13. The method of claim 10 wherein said performing of said bump test and said determining of said optimal tuning are performed when said predetermined criteria for alarming indicates that corrective action should be undertaken.

14. The method of claim 13 wherein said performing of said bump test and said determining of said optimal tuning are automatically performed when said predetermined criteria for alarming indicates that corrective action should be undertaken.

15. The method of claim 13 wherein said corrective action is correction of a process problem or a hardware problem and said bump test and said determining of said optimal tuning are performed automatically after said process problem or said hardware problem is corrected.

16. A method for measuring the control provided by a control system to a process, said system having a controller for controlling the position of a final control element to control a process variable and said method comprising the steps of:
    (a) determining process model parameters for a simple model and a high order model of said process;
    (b) predicting off control data using said determined simple and high order models parameters and the value of said process variable and said final control element position;
    (c) determining the optimal tuning using said determined simple and high order models parameters; and
    (d) forecasting the optimal process performance from said predicted off control data and said determined optimal tuning.

17. The method of claim 16 further comprising the step of gathering said value of said process variable and said final control element position.

* * * * *